US009578111B2

(12) United States Patent
Kasivajjula et al.

(10) Patent No.: US 9,578,111 B2
(45) Date of Patent: Feb. 21, 2017

(54) ENABLING DIFFERENT CLIENT CONTEXTS TO SHARE SESSION INFORMATION

(75) Inventors: Bhavan Kumar Kasivajjula, Surfers Paradise (AU); Scott Anthony Exton, Ormeau Hills (AU); Keiran Robinson, Bonogin (AU)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/491,706

(22) Filed: Jun. 8, 2012

(65) Prior Publication Data
US 2013/0332618 A1    Dec. 12, 2013

(51) Int. Cl.
*H04L 29/08*    (2006.01)

(52) U.S. Cl.
CPC .......... *H04L 67/146* (2013.01); *H04L 67/142* (2013.01)

(58) Field of Classification Search
CPC . G06Q 30/0601; G06Q 30/0255; G06F 21/41; G06F 21/31; G06F 2221/2101; G06F 2221/0706; H04L 67/02; H04L 67/14; H04L 69/329; H04L 67/146
See application file for complete search history.

(56) References Cited

U.S. PATENT DOCUMENTS

| | | | |
|---|---|---|---|
| 6,041,357 A * | 3/2000 | Kunzelman et al. | 709/228 |
| 6,978,366 B1 * | 12/2005 | Ignatchenko | G06F 21/6218 713/165 |
| 7,188,181 B1 * | 3/2007 | Squier et al. | 709/228 |
| 7,500,262 B1 | 3/2009 | Sanin et al. | |
| 8,132,242 B1 * | 3/2012 | Wu | H04L 63/0884 713/168 |
| 8,281,014 B2 * | 10/2012 | Stanev et al. | 709/227 |
| 8,549,038 B2 * | 10/2013 | Narasinghanallur et al. | 707/781 |
| 8,732,805 B2 * | 5/2014 | Kavantzas | G06F 21/335 380/270 |
| 2003/0005118 A1 * | 1/2003 | Williams | 709/225 |
| 2003/0195963 A1 * | 10/2003 | Song | H04L 67/142 709/227 |
| 2006/0130132 A1 * | 6/2006 | Dharmarajan | 726/10 |
| 2006/0294196 A1 | 12/2006 | Feirouz et al. | |

(Continued)

OTHER PUBLICATIONS

Nye, "Enabling Microsoft Office Sharepoint Server Client Integration through Tivoli Access Manager e-business WebSEAL using Forms Authentication," Sep. 16, 2008.

(Continued)

*Primary Examiner* — Jerry Dennison
(74) *Attorney, Agent, or Firm* — Jeffrey S. LaBaw; David H. Judson

(57) ABSTRACT

The problem of sharing session information across client contexts is addressed by binding initial session information to a persistent, short-lived and one-time use temporary identifier. This identifier is persisted on a client side (e.g., through a cookie jar) that is shared among the different client contexts that can share the original session. This temporary identifier, in turn, allows one or more other sessions to use the original session information by acting as an index into that session information, which is stored on the server side. Preferably, this temporary identifier contains a unique identifier (ID) that is generated as a sufficiently-complex random number. A mapping back to the real session identifier is maintained on the server side for this short-lived ID.

21 Claims, 5 Drawing Sheets

(56) References Cited

U.S. PATENT DOCUMENTS

| | | | |
|---|---|---|---|
| 2007/0208862 A1* | 9/2007 | Fox | H04L 67/142 709/227 |
| 2009/0094688 A1* | 4/2009 | Roy | 726/7 |
| 2010/0146611 A1 | 6/2010 | Kuzin et al. | |
| 2011/0055912 A1* | 3/2011 | Fusari et al. | 726/8 |
| 2011/0078319 A1 | 3/2011 | Ishida | |
| 2011/0202989 A1* | 8/2011 | Otranen | H04L 63/0815 726/8 |
| 2011/0213956 A1 | 9/2011 | Mukkara et al. | |
| 2013/0124756 A1* | 5/2013 | Voronel | H04L 63/126 709/239 |
| 2013/0332618 A1* | 12/2013 | Kasivajjula | H04L 67/142 709/228 |

OTHER PUBLICATIONS

Fiala, "Sharing session data between contexts How-To," located at http://www.fwd.at/tomcat/sharing-session-data-howto.html, dated May 2003.

* cited by examiner

ENABLING DIFFERENT CLIENT CONTEXTS TO SHARE SESSION INFORMATION

BACKGROUND OF THE INVENTION

Technical Field

This disclosure relates generally to web application security and in particular to a method and system for enabling different client contexts to share the same session information.

Background of the Related Art

It is known in the prior art to provide so-called Web portals, which are web-based mechanisms that centralize access to information, applications, and services for employees, customers, or partners. A Web portal delivers a consolidated view that lets users access electronic resources of the organization using a standard technology (a web browser), simply and efficiently. Within a Web portal or like environment, typically a proxy or web server acts as a front-end "point of contact" to a set of back-end applications or application components. In this type of environment, it is desirable that the mechanism used to provide authentication and session management at the web portal layer should also provide these functions for any back-end applications that are included in a consolidated view.

In this type of environment, approaches to session management typically have each back end application or application component requiring its own session state management, and each such application or component may implement its own session management technique. Where an end user is accessing multiple applications within a single enterprise, his or her browser ends up managing independent session management items (often as many as a different item per application). Typically, in this environment, these items are HTTP cookies, as the behavior of such cookies (although not intended for session management) provides reasonable session management. HTTP cookies (see IETF RFC 2109) provide a way of managing sessions and state between web browsers and web servers using the HTTP protocol. These cookies typically are stored in the web browser's session cache, sometimes called a cookie jar.

In web-based session management systems, currently there exists no mechanism to share session information between different user agent contexts in a secure way. A "context" is a client-server operating state with respect to a particular user agent application, on the one hand, and a designation application, on the other hand, following authentication of the client to the server. Typically, if a user, after establishing session A in one context A, then switches to context B, the previous session information A is no longer available to the client user agent. This can lead to multiple authentication requests for the same user.

The most common existing solutions to this problem are based on URL rewriting or embedding the original session information in a cookie, but each such approach has its own disadvantage. Thus, for example, in the URL rewriting technique, the original session identifier is passed from the client to the web application in a URL string, e.g., as a URL parameter. In the cookie approach, the original session identifier is written to a persistent jar on the client side and then passed to every context. In both cases, however, because the original session information is transmitted with the response, it is vulnerable to security attacks such as unauthorized session identifier manipulation, or stealing of user credentials. In an alternative approach, the real session information is transformed into a different format, and each new client request includes this transformed information to use the original session information. The transformed entity typically is long-lived on the server. Still other approaches require special client-side software.

There remains a need in the art to provide for session sharing across multiple client contexts.

BRIEF SUMMARY OF THE INVENTION

According to this disclosure, the problem of sharing session information across client contexts is addressed by binding the initial session information to a persistent, short-lived and one-time use temporary identifier. This identifier preferably is persisted on the client side (e.g., through a cookie jar or other data store) that is shared among the different client contexts that can share the original session. This temporary identifier, in turn, allows one or more other sessions to use the original session information by acting as an index into that session information, which is stored on the server side. Preferably, this temporary identifier contains a unique identifier (ID) that is generated as a sufficiently-complex random number or pseudorandom number. A mapping back to the real session identifier is maintained on the server side for this short-lived ID.

A method of sharing session information begins when a client in a first context authenticates and establishes a session with a web server front-end. When a context request is about to occur, the client requests a temporary session identifier from the web server. In response, the web server generates a temporary session ID, creates a mapping to the real session, and sends the temporary session ID back to the client (still operating in context A), preferably in a persistent cookie. This persistent cookie is automatically saved in the client-side persistent cookie jar, which normally shares data across client contexts already. When the client then switches from the first context to the second context, the client (now in context B) makes a request for a resource at a destination application associated with the server front-end. This request includes the temporary session cookie, which the client has automatically retrieved from the client-side persistent cookie jar and added to the request. Based on the temporary session cookie (and, in particular, the temporary session ID therein), the server locates the real session identifier and checks to ensure that the mapping (to the real session information) has not expired. Preferably, the mapping for the temporary cookie (namely, the temporary session ID) is then removed from the server to enforce its one-time usage. The server then forwards the request onto the destination application. The routine then continues with the server adding the real session identifier into a non-persistent cookie. The server then sets an empty temporary session cookie within the response. This has the effect of clearing the cookie from the persistent cookie jar on the client to complete the process.

In an alternative embodiment, the above-described method is performed in a proxy apparatus. The apparatus is positioned between a client browser and one or more back-end applications and carries out the method during a session with a user operating the client browser.

In another alternative embodiment, the above-described method is performed by a computer program product in a computer readable medium for use in a data processing system, which system may be positioned between a client browser and one or more backend applications. The computer program product holds computer program instructions which, when executed by the data processing system, perform the method.

The foregoing has outlined some of the more pertinent features of the invention. These features should be construed to be merely illustrative. Many other beneficial results are attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
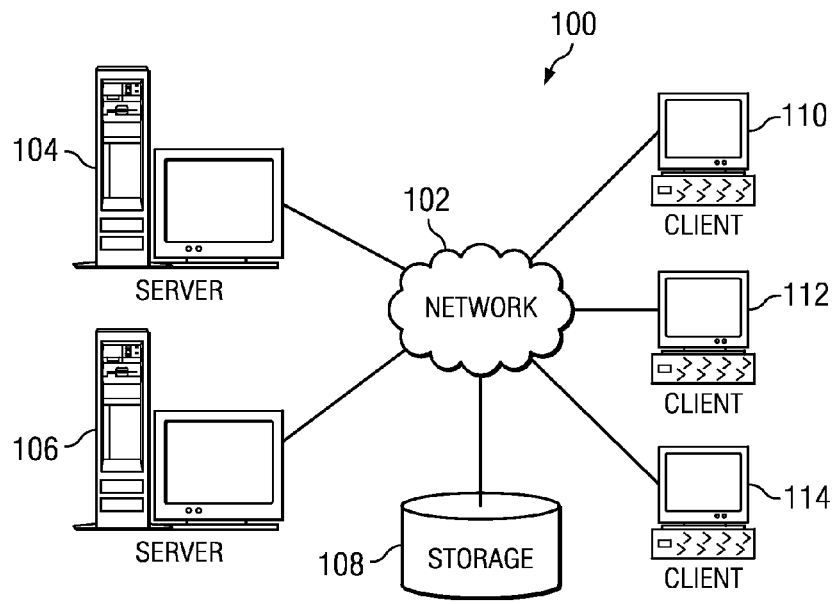
FIG. 1 depicts an exemplary block diagram of a distributed data processing environment in which exemplary aspects of the illustrative embodiments may be implemented.
Figure 2:
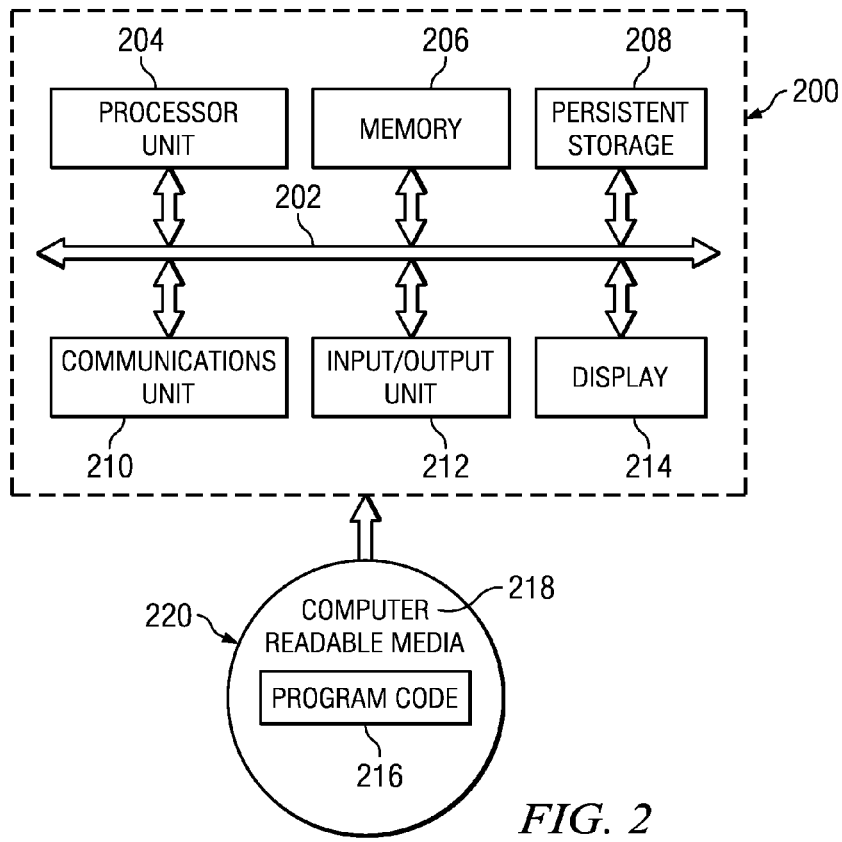
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C or the like, and conventional procedural programming languages, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
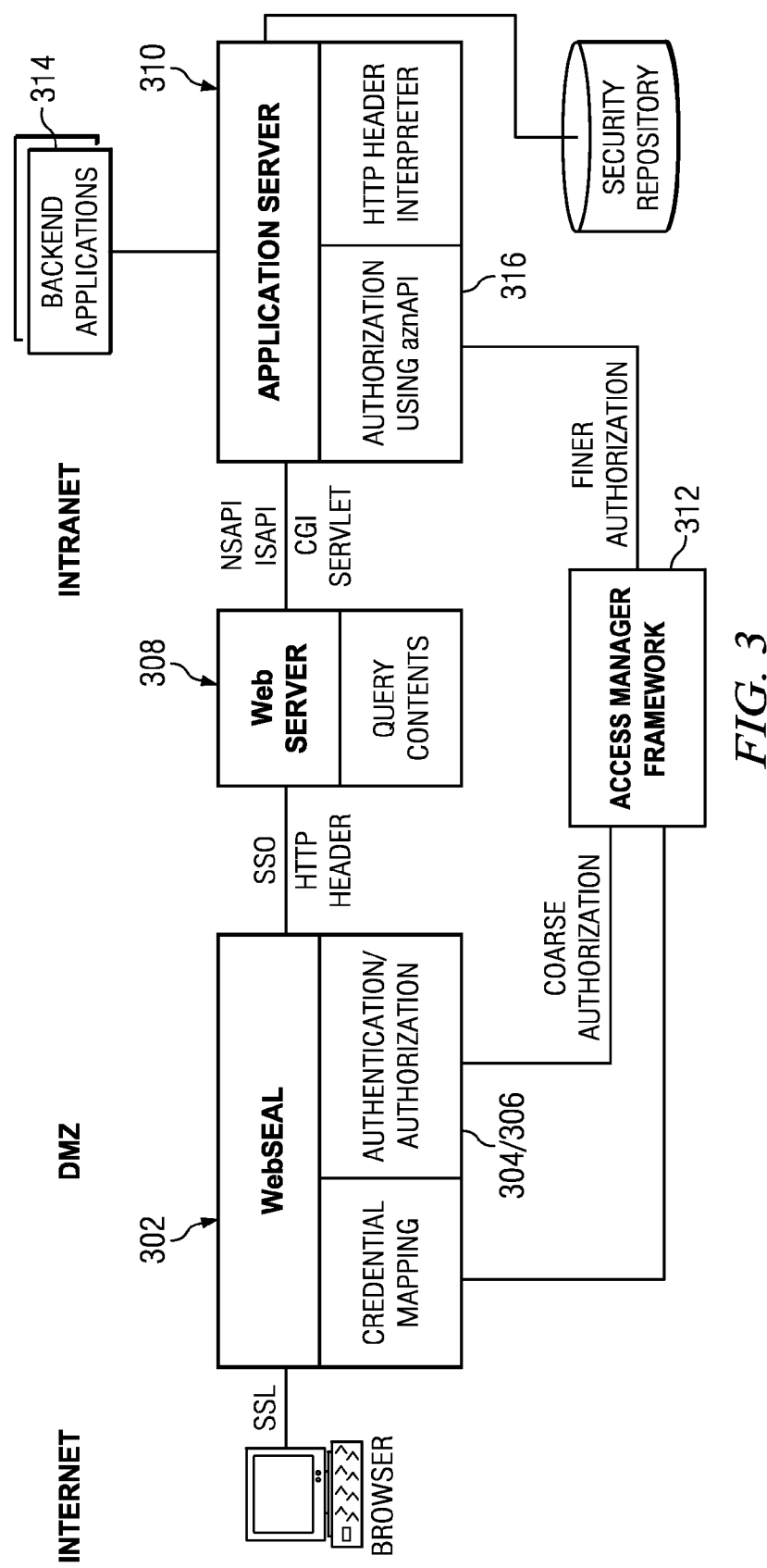
FIG. 3 illustrates a known Web portal having an access management framework in which the subject disclosure may be implemented.

As will also be described, the technique that is the subject of this disclosure also may be implemented in a system that includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

Figure 4:
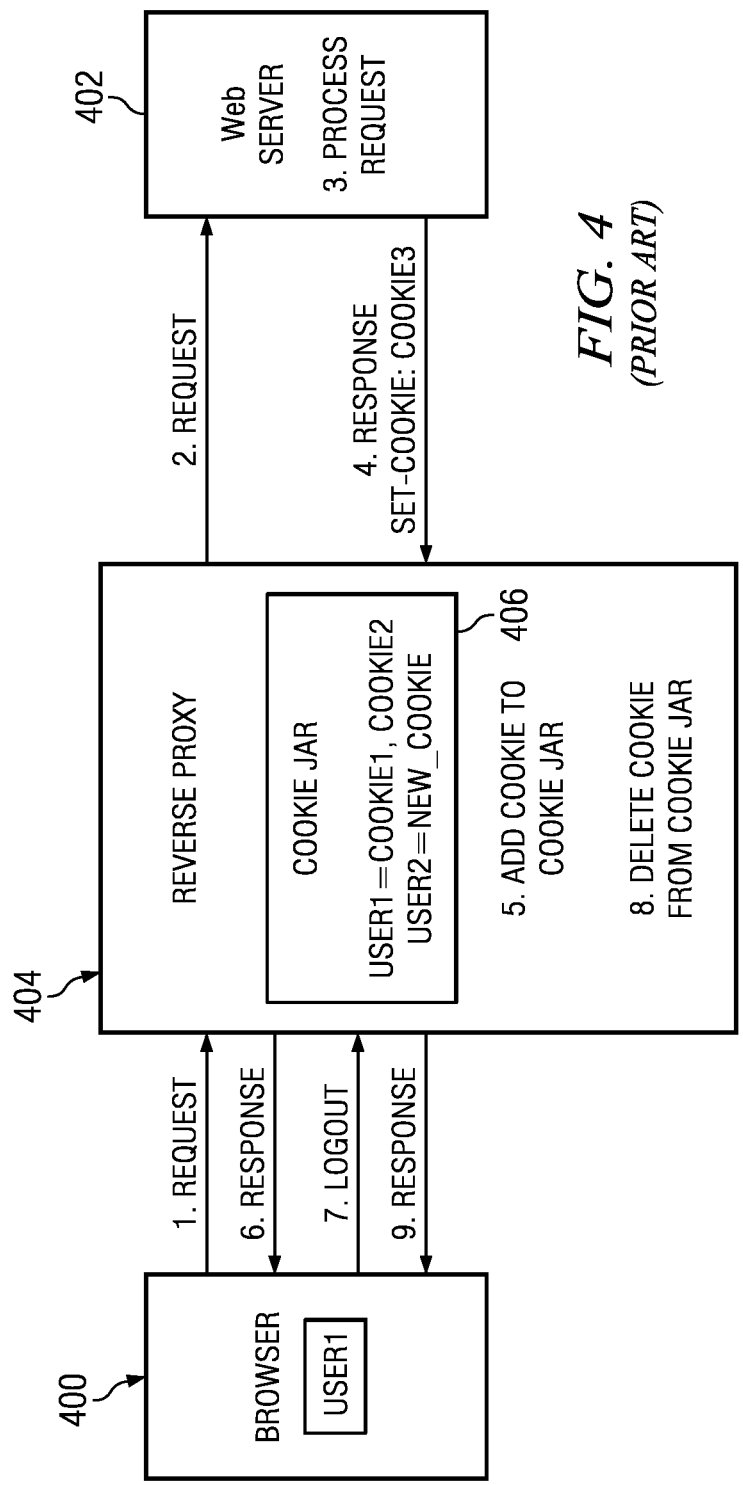
FIG. 4 is a simplified block diagram of a web browser interacting with a backend application through a reverse proxy that stores cookies in a session cache or "cookie jar" as is known in the prior art.

FIG. 4 is a simplified block diagram showing an example information flow for session management in a proxy environment, such as shown in FIG. 3. In this example, a first user (User1) of web browser 400 has established an existing authentication session with backend web server 402 using the reverse proxy 404, such as TAM. The proxy may include a session cache 406 (or "cookie jar") that is instantiated on a per-user session basis. In step (1), the first user uses the web browser 400 to make an HTTP request to the web server 402 via the reverse proxy 404. The reverse proxy 404 receives the request and, at step (2), passes it to the web server 402. The web server 402 process the request at step (3). At step (4), the web server 402 returns a response to the reverse proxy 404 containing a Set-Cookie HTTP header. At step (5), the reverse proxy 404 detects the Set-Cookie header and adds the cookie to its cookie jar 406 for the authenticated user (in this case, used). At step (6), the reverse proxy sends the response back to the web browser 400 but removes the 'Set-Cookie' header. Thus, in this prior art approach, typically the cookie is not returned to the web browser. Thereafter, assume that the first user then uses the browser to log out of the session it has with the reverse proxy 404. This is step (7). At step (8), the reverse proxy 404 accesses the cookie jar to determine whether to delete any cookies. At step (9), the reverse proxy 404 returns a logout response to the browser. The reverse proxy then completes other session cleanup activities.

Each of the client and server may be implemented as a data processing system, such as illustrated in FIG. 2. Typically, client-server communications are provided over a secure transport medium (e.g., via SSL, TLS, or the like). As noted above, the client typically has a browser or other rendering engine, and it may also have a data store associated therewith. The data store may include a cookie jar in which server-side cookies are maintained in a known manner. The cookie jar 8 may be a dedicated cache, or any memory or persistent storage.

Enabling Different Client Contexts to Share Session Information

With the above as background, a method for sharing session data across client contexts is now described.

Figure 5:
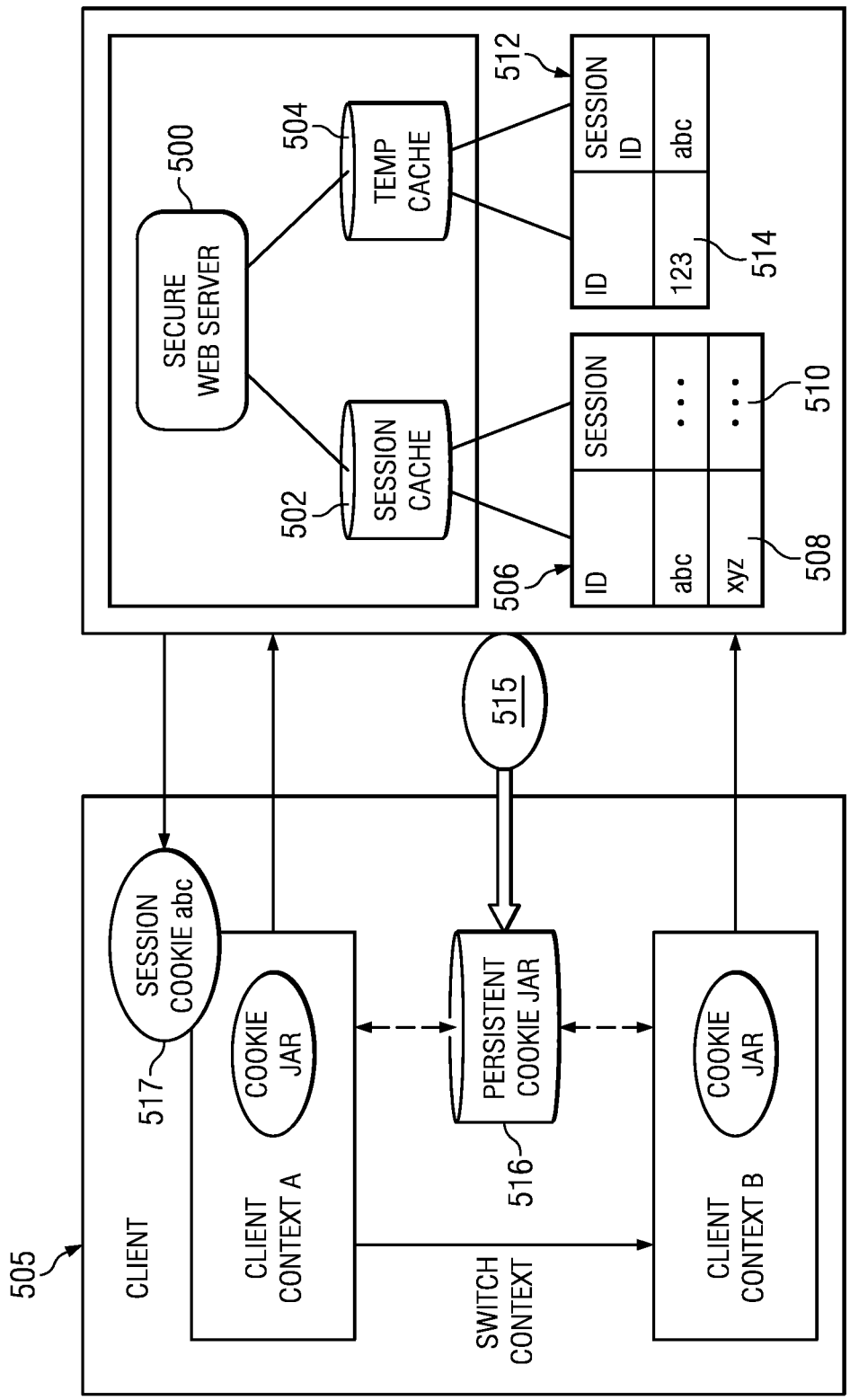
FIG. 5 illustrates a representative use scenario wherein session information is securely shared across first and second client contexts according to this disclosure.

FIG. 5 illustrates a representative context-switching scenario of this disclosure. In this example, there is a secure web server 500 that has associated therewith both a session cache 502 (sometimes referred to as a real session cache), and a temporary session cache 504. The caches 502 and 504 may be part of the same shared memory, or they may be distinct memory stores. The session cache 502 includes a table 506 that, for each active session, associates (e.g., in a row) a unique session identifier (ID) 508 with other session data 510. This is a conventional data structure. The session identifier 508 is stored as a non-persistent cookie. The temporary cache, in contrast, includes a table 512 that associates (e.g., in a row) a temporary session identifier 514 with the real session identifier 508. The temporary session identifier 514 is designed to be a short-time, non-persistent value that acts merely as an index into the real session information. The value may be stored within a cookie (in which case the cookie acts as a transport mechanism), or the value may be the cookie itself. In a representative embodiment, the temporary session identifier 514 is a random number, or a pseudorandom number. As also illustrated in FIG. 5, the client 505 has associated therewith a persistent cookie jar 516, which is a data structure that stores persistent cookies. When the client switches from a first context (context A) to a second context (context B), the second client context automatically references the persistent cookie jar 516. This is a default client-side operation.

In operation, the "real" session information is stored in the session cache 502 indexed by a non-persistent cookie. When the client 505 detects that it will be switching to a new context (i.e., from context A to context B in this example), it requests a temporary, persistent session cookie from the server 500. The server 500 generates the temporary session identifier and stores it, together with the real session identifier, in the temporary session cache table 512. The temporary session identifier is then returned to the client in a persistent cookie 515. The persistent cookie 515 is stored in the persistent cookie jar 516 in the usual manner. Whenever the second client context sends a request to the server, it will automatically reference the persistent cookie from the persistent cookie jar and send it to the server. Thus, when the client switches contexts and makes the request to the server, the server receives the persistent cookie 515. The server 500 uses the temporary session identifier in this cookie to retrieve the corresponding session identifier from the temporary cache table 512, validates that the session entry has not expired, removes the mapping from the temporary session cache, and then sends back to the client the real session identifier within a non-persistent cookie 517. At this point both client contexts have access to the same session.

Figure 6:
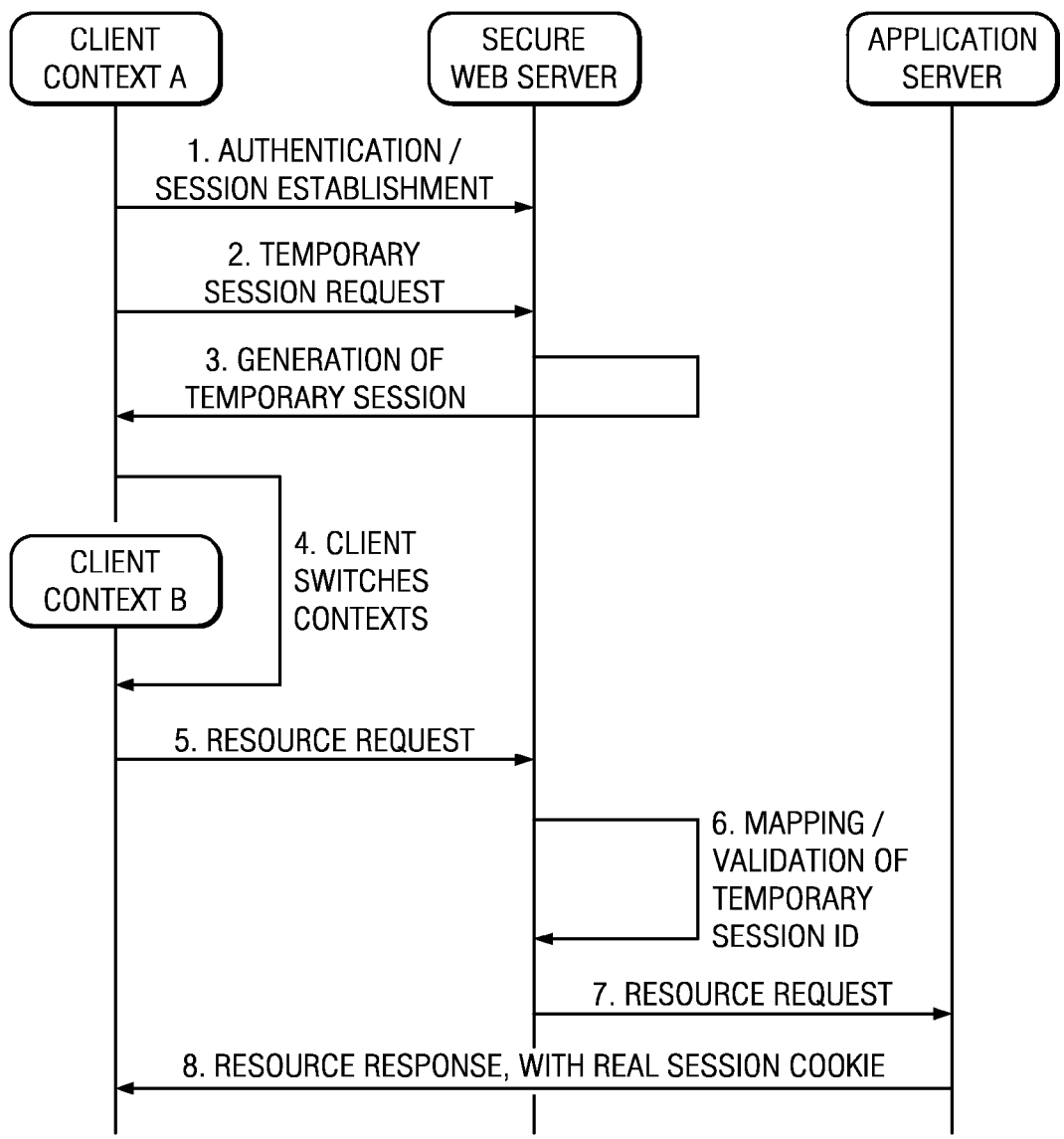
FIG. 6 illustrates a scenario diagram illustrating a representative client-server interaction according to this disclosure.

FIG. 6 illustrates a representative scenario diagram of the interactions among the client user agent, the secure web server front-end, and a destination application illustrating how session information is share during a user agent context-switch according to this disclosure.

As illustrated in this scenario diagram, there is a client, which communicates securely with a web server. This communication typically occurs over SSL, TLS, or the like. The client, as noted above in FIG. 5, maintains a client-side persistent cookie jar, and the server maintains both a session cache, and a temporary session cache. The client is adapted to switch between first and second client contexts. Any client application may act as a user agent. As an example, assume a user, using a web browser, chooses to open a Microsoft® Word® document on a SharePoint® server. (These examples are for explanatory purposes only; they are not intended to limit the disclosure in any way). The user then authenticates with the server and establishes a session. This creates a first user agent context. Now, assume that the user now desires to open the document. This operation, however, is presumed to require Microsoft Word. Upon taking an action to open the document, a context switch occurs from the browser to an instance of Microsoft Word, which itself must be opened and executing before the document can be opened therein. This is the second context. Normally, the session initially established (between the web browser and the SharePoint server) would not be available to the second context. Using the approach herein, however, the second client context shares the same session information.

With respect to FIG. 6, the routine begins at step 1 with the client in context A authenticates and establishes a session with the secure web server front-end. The destination application may be supported on or otherwise is associated with the secure web server in the manner previously illustrated in FIG. 3. At step 2, the client in context A recognizes that a context switch is about to take place and requests a temporary session identifier from the web server. The request for the temporary session identifier may occur at another time and/or under another circumstance, although typically the request is made as described. At step 3, the secure web server generates a temporary session ID, creates a mapping to the real session, and sends the temporary session ID back to the client (still operating in context A) in a persistent cookie. The temporary session ID typically is a random number, a pseudorandom number, or some other identifier that is sufficiently unique for the purposes described herein. This persistent cookie is automatically saved in the client-side persistent cookie jar, which normally shares data across client contexts already. At step 4, the client switches context from context A to context B. The routine then continues at step 5, with the client (now in context B) making a request for a resource (or otherwise taking some action that will require session information). Before the request is sent, the temporary session cookie is automatically retrieved from the client-side persistent cookie jar and added to the request. At step 6, the server locates the real session identifier based on the temporary session cookie and checks to ensure that the mapping has not expired. Preferably, the mapping for the temporary cookie is then removed from the server (to enforce its one-time usage). At step 7, the server forwards the request onto the destination application. The routine then continues at step 8, with the server adding the real session identifier into a non-persistent cookie. The server then sets an empty temporary session cookie within the response. This has the effect of clearing the cookie from the persistent cookie jar on the client to complete the process.

The "context" as used herein may switch from any first context, to any second context. There is no limitation on the particular client application or server application that is associated with a particular context. As used herein, a first "context" is instantiated (i.e. exists) upon a user authentication to an application associated with the server. A second "context" is one in which the user agent associated with the first context is permitted to switch to without requiring a new user authentication.

The client includes appropriate control routines to manage the switching from one context to another context. For purposes of this disclosure, it is assumed that a prospective switch from a first client context to a second client context is permitted, and that the client desires to have the existing session information (established as a result of the authentication in association with the first client context) to be shared by the second client context. If the session information is not to be shared across client contexts, the disclosed subject matter is not required.

Thus, according to this disclosure, the server-side of the operation is as follows. The server first receives a request for a temporary and persistent cookie, where the request is issued by the client in association with a prospective switch from the first client context to a second client context. In response to the request, a unique temporary session identifier is associated with the temporary and persistent cookie. In effect, the server "sets" the temporary and persistent cookie. The server then associates the unique temporary session identifier with the session information by storing these values in the temporary session cache table. The server then returns the temporary and persistent cookie (which includes the temporary session identifier) to the client, which (by virtue of it being a persistent cookie) then stores it in the client-side persistent cookie jar. Thereafter, and upon a subsequent receipt (at the server) of the temporary and persistent cookie following an actual switch from the first context to the second context, the unique temporary session identifier (in the temporary and persistent cookie) is then used by the server to attempt to retrieve the session information for use by the client in the second context. To this end, the server determines if a session identified by the session information has expired. If not, the server de-associates the unique temporary session identifier and the session information (e.g., by removing the unique temporary session identifier for the temporary session cache), and sends the session information to the client.

The described technique provides significant advantages. The technique provides a unified solution for sharing session information between or among different client contexts in a secure manner. As has been described, this is achieved by binding the initial session information to a persistent, short-lived and one-time use temporary identifier. This temporary identifier, in turn, allows one or more other sessions to use the original session information by acting as an index into it. This identifier preferably is persisted (e.g., through a cookie jar or other data store) that is shared among the different client contexts that can share the original session. Preferably, this temporary identifier contains or constitutes a unique identifier (ID) that is generated as a sufficiently-complex random number. A mapping back to the real session identifier is maintained on the server side for this short-lived ID.

As has been described, the temporary session information is used to map back to the real session. The temporary session identifier's lifetime preferably is much less than the lifetime of the real session cookie, and the temporary cookie's management preferably is implemented on the server side (of the client-server communication) to provide additional security. Preferably, and as noted above, the temporary cookie (and thus the identifier therein) only is valid for a single use. Moreover, because the temporary cookie information merely acts as an index into the original session, the chance of session ID corruption or manipulation is significantly reduced. Further, a separate clean-up thread is used to maintain the mapping table of temporary session identifiers, thereby automatically removing expired or used entries to minimize its size for better performance. Taken together, these characteristics provide better security by reducing an amount of time that the temporary session identifier is valid, and by reducing an amount of time that the identifier lives in the persistent cookie jar on the client machine. Additionally, the temporary cookie approach as described herein provides a consistent user experience in terms of session data, timeout values with respect to all session-sharing client contexts.

Further, no URL rewriting or embedding of the original session information in a cookie are required by this technique.

Moreover, the technique as has been described is further advantageous because it is simple to implement. The approach takes advantage of the fact that a persistent cookie jar (on the client) is already shared between different contexts. By setting a short-time, non-persistent cookie having data that acts as an index into a data store of the real session information, and by further allowing this temporary cookie to be managed by the server side, different client contexts can share the same session information securely and efficiently.

The functionality described above may be implemented as a standalone approach, e.g., a software-based function executed by a processor, or portions of it (such as the cookie setting, server-side cookie management, and responding to context switching) may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cookie generating, storing and processing components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a session sharing mechanism in a client or proxy, as has been described above.

The session sharing function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "cookie" should be broadly construed to refer to an HTTP cookie (RFC 2109) or, more generally, any data structure that includes session-specific data associated with the server-side instance that returns that data structure.

In the client-side of the embodiment, the cookie jar search and context-switching request functionality may be implemented using AJAX or other client-side technologies.

Having described our invention, what we now claim is as follows.

The invention claimed is:

1. A method for sharing pre-existing session information, the session information representing a session having been established upon authentication of a client to a server in a first client context, the client having a cookie store storing information accessible across multiple client contexts, wherein a context is a client-server operating state with respect to a particular client application, comprising:
  receiving a request for a temporary and persistent cookie, the request having been issued by the client in association with a prospective switch from the first client context to a second client context;
  in response to the request, associating a unique temporary session identifier with the temporary and persistent cookie, the unique temporary session identifier being distinct from the pre-existing session information that was established upon authentication of the client to the server in the first context;
  binding the unique temporary session identifier to the pre-existing session information and the session;
  returning to the client, for storage in the cookie store, the temporary and persistent cookie that includes the unique temporary session identifier;
  upon a subsequent receipt of the temporary and persistent cookie following an actual switch from the first context to the second context, using the unique temporary session identifier therein to retrieve the pre-existing session information for use by the client in the second context;
  upon validating existence of the session represented by the session information, providing the client the session information so that both the first and second client contexts share the session information, the session information provided in a non-persistent cookie; and
  in addition to providing the session information in the non-persistent cookie, providing the client an empty temporary session cookie that, upon receipt at the client, clears the temporary and persistent cookie from the cookie store.

2. The method as described in claim 1 wherein validating existence of the session includes:
  determining when the session identified by the session information has expired,
  when the session identified by the session information has not expired, de-associating the unique temporary session identifier and the session information.

3. The method as described in claim 1 wherein the session information is sent to the client in a non-persistent cookie.

4. The method as described in claim 1 wherein the unique temporary session identifier is a random number.

5. The method as described in claim 1 wherein the temporary and persistent cookie is a one-time use cookie.

6. The method as described in claim 1 wherein the temporary and persistent cookie has a lifetime that is less than a lifetime of the session information.

7. Apparatus, comprising:
a processor;
a data store;
computer memory holding computer program instructions executed by the processor for sharing pre-existing session information, the session information representing a session having been established upon authentication of a client to a server in a first client context, the client having a cookie store storing information accessible across multiple client contexts, wherein a context is a client-server operating state with respect to a particular client application, by:
receiving a request for a temporary and persistent cookie, the request having been issued by the client in association with a prospective switch from the first client context to a second client context;
in response to the request, associating a unique temporary session identifier with the temporary and persistent cookie, the unique temporary session identifier being distinct from the pre-existing session information that was established upon authentication of the client to the server in the first context;
binding the unique temporary session identifier with the pre-existing session information and the session;
returning to the client, for storage in the cookie store, the temporary and persistent cookie that includes the unique temporary session identifier;
upon a subsequent receipt of the temporary and persistent cookie following an actual switch from the first context to the second context, using the unique temporary session identifier therein to retrieve the pre-existing session information for use by the client in the second context;
upon validating existence of the session represented by the session information, providing the client the session information so that both the first and second client contexts share the session information, the session information provided in a non-persistent cookie; and
in addition to providing the session information in the non-persistent cookie, providing the client an empty temporary session cookie that, upon receipt at the client, clears the temporary and persistent cookie from the cookie store.

8. The apparatus as described in claim 7 wherein validating existence of the session further includes:
determining when the session identified by the session information has expired,
when the session identified by the session information has not expired, de-associating the unique temporary session identifier and the session information.

9. The apparatus as described in claim 7 wherein the session information is sent to the client in a non-persistent cookie.

10. The apparatus as described in claim 7 wherein the unique temporary session identifier is a random number.

11. The apparatus as described in claim 7 wherein the temporary and persistent cookie is a one-time use cookie.

12. The apparatus as described in claim 7 wherein the temporary and persistent cookie has a lifetime that is less than a lifetime of the session information.

13. A computer program product in a non-transitory computer readable storage medium for use in a data processing system, the computer program product holding computer program instructions which, when executed by the data processing system, perform operations for sharing pre-existing session information, the session information representing a session having been established upon authentication of a client to a server in a first client context, the client having a cookie store storing information accessible across multiple client contexts, wherein a context is a client-server operating state with respect to a particular client application, the operations comprising:
receiving a request for a temporary and persistent cookie, the request having been issued by the client in association with a prospective switch from the first client context to a second client context;
in response to the request, associating a unique temporary session identifier with the temporary and persistent cookie, the unique temporary session identifier being distinct from the pre-existing session information that was established upon authentication of the client to the server in the first context;
binding the unique temporary session identifier with the pre-existing session information and the session;
returning to the client, for storage in the cookie store, the temporary and persistent cookie that includes the unique temporary session identifier;
upon a subsequent receipt of the temporary and persistent cookie following an actual switch from the first context to the second context, using the unique temporary session identifier therein to retrieve the pre-existing session information for use by the client in the second context;
upon validating existence of the session represented by the session information, providing the client the session information so that both the first and second client contexts share the session information, the session information provided in a non-persistent cookie; and
in addition to providing the session information in the non-persistent cookie, providing the client an empty temporary session cookie that, upon receipt the client, clears the temporary and persistent cookie from the cookie store.

14. The computer program product as described in claim 13 wherein validating existence of the session includes further includes:
determining when the session identified by the session information has expired,
when the session identified by the session information has not expired, de-associating the unique temporary session identifier and the session information.

15. The computer program product as described in claim 13 wherein the session information is sent to the client in a non-persistent cookie.

16. The computer program product as described in claim 13 wherein the unique temporary session identifier is a random number.

17. The computer program product as described in claim 13 wherein the temporary and persistent cookie is a one-time use cookie.

18. The computer program product as described in claim 13 wherein the temporary and persistent cookie has a lifetime that is less than a lifetime of the session information.

19. The method as described in claim 1 wherein the unique temporary session identifier is maintained in a mapping table of unique temporary session identifiers, the mapping table being distinct from a data store that stores the session information, and wherein the method further includes executing a clean-up of the mapping table of unique temporary session identifiers to remove expired or used entries.

20. The apparatus as described in claim 7 wherein the unique temporary session identifier is maintained in a mapping table of unique temporary session identifiers, the mapping table being distinct from a data store that stores the session information, and wherein the computer program instructions also execute a clean-up of the mapping table of unique temporary session identifiers to remove expired or used entries.

21. The computer program product as described in claim 13 wherein the unique temporary session identifier is maintained in a mapping table of unique temporary session identifiers, the mapping table being distinct from a data store that stores the session information, and wherein the operations further include executing a clean-up of the mapping table of unique temporary session identifiers to remove expired or used entries.

* * * * *